US006902473B1

(12) United States Patent
Goobeck

(10) Patent No.: US 6,902,473 B1
(45) Date of Patent: Jun. 7, 2005

(54) VEHICLE VENTILATION CONDUIT SYSTEM

(76) Inventor: Kenneth D. Goobeck, 16791 W. Derby Dr., Loxahatchee, FL (US) 33470

( * ) Notice: Subject to any disclaimer, the term of this patent is extended or adjusted under 35 U.S.C. 154(b) by 0 days.

(21) Appl. No.: 10/752,292

(22) Filed: Jan. 6, 2004

(51) Int. Cl.[7] ................................................ B60S 1/54
(52) U.S. Cl. ...................... 454/127; 454/152; 454/903
(58) Field of Search ............................. 454/152, 155, 454/127, 144, 903

(56) References Cited

U.S. PATENT DOCUMENTS

| 2,882,809 | A |   | 4/1959  | Nelson              |         |
|-----------|---|---|---------|---------------------|---------|
| 3,211,076 | A |   | 10/1965 | Chancellor et al.   |         |
| 3,280,896 | A |   | 10/1966 | Goodson et al.      |         |
| 4,051,768 | A | * | 10/1977 | Bayles              | 454/152 |
| 4,172,494 | A |   | 10/1979 | Saulters            |         |
| 4,173,369 | A |   | 11/1979 | Roggin              |         |
| 4,454,596 | A |   | 6/1984  | Wunsch et al.       |         |
| 4,478,052 | A |   | 10/1984 | McDowell            |         |
| 4,981,324 | A |   | 1/1991  | Law                 |         |
| 5,004,286 | A |   | 4/1991  | Taylor, III et al.  |         |
| 5,511,842 | A |   | 4/1996  | Dillon              |         |
| 5,794,683 | A |   | 8/1998  | Kutzner             |         |
| 5,823,869 | A | * | 10/1998 | Paturzo             | 454/152 |
| 5,839,293 | A | * | 11/1998 | Teitelbaum et al.   | 62/244  |
| 5,902,181 | A | * | 5/1999  | Bain                | 454/144 |
| 6,079,781 | A | * | 6/2000  | Tilley              | 297/250.1 |
| 6,131,645 | A | * | 10/2000 | Barr                | 165/41  |

* cited by examiner

Primary Examiner—Derek S. Boles
(74) Attorney, Agent, or Firm—Gold & Rizvi, P.A.; Glenn E. Gold; H. John Rizvi

(57) ABSTRACT

A vehicle ventilation conduit system for distributing heating or cooling air from an air vent to a rear vehicle compartment in a vehicle such as a police cruiser. The system includes an elongated main air flow conduit having an inlet end and a discharge end. A front sealing adaptor is provided on the main air flow conduit at the inlet end for releasably and sealingly engaging the air vent. A rear sealing adaptor is provided on the main air flow conduit at the discharge end for releasably and sealingly engaging the rear vehicle compartment. At least one auxiliary air flow conduit is typically provided in pneumatic communication with the main air flow conduit to facilitate cooling an electronic accessory such as a laptop computer in the vehicle.

20 Claims, 3 Drawing Sheets

VEHICLE VENTILATION CONDUIT SYSTEM

FIELD OF THE INVENTION

The present invention relates generally to systems for ventilating vehicle interiors. More particularly, the present invention relates to a vehicle ventilation conduit system for transferring cooled and/or heated air exiting from a front compartment of a vehicle to a rear compartment of the vehicle.

DESCRIPTION OF THE PRIOR ART

Systems for distributing cooled and/or heated air are widely used in automotive vehicles to maintain the interior temperature of the vehicles at a comfortable level. Most vehicles include multiple vents which are provided in the vehicle dashboard and eject cool or warm air, as appropriate, on both the front seat occupants and rear seat occupants of the vehicle. Some large vehicles, such as vans and SUVs, include a separate set of vents behind the front driver and passenger seat to cool or warm the rear seat occupants. This set of vents may include a separate temperature control system for the convenience and comfort of the rear seat occupants.

In vehicles such as police cruisers and taxicabs, a protective partition commonly separates the front and rear seats of the vehicle into front and rear compartments. Such a protective partition serves to protect the vehicle driver from the rear compartment occupants of the vehicle during operation of the vehicle. Protective partitions for vehicles typically include a transparent panel that extends from the top of the front seat and the ceiling of the vehicle and extends across the transverse dimension of the vehicle.

One of the common drawbacks of protective partitions is that the partitions are retrofitted to vehicles which are not equipped with a separate set of air vents for the rear seat occupants of the vehicle. Thus, these vehicles normally depend on air ejected from the set of vents in the vehicle dashboard of the front seat to warm and/or cool the rear seat occupants. However, the protective partition blocks flow of warm or cool air to the rear compartment, thus preventing heating or cooling of the rear compartment occupants.

A typical police cruiser having a standard protective partition typically exhibits an 8–10° F. temperature differential between the front and rear vehicle compartments. During the summer months or in a high-temperature climate, it is not uncommon for temperatures in the rear of a police vehicle to exceed 110° F. (43.3° C.) shortly after the vehicle has been turned off. Once the vehicle is re-started, the front compartment typically cools relatively quickly. However, due to the restricted airflow caused by the partition, 30 minutes or more may be needed to cool down the rear compartment—albeit only to a temperature of 8–10° F. greater than the front compartment temperature.

In the past, criminal suspects were typically transported to a police station fairly quickly following an arrest. However, with the advent of computer and wireless networking technology, most modern police cruisers are equipped such that the majority of arrest paperwork is completed in the vehicle, the suspect(s) contained in the hot rear compartment. This can be detrimental to the health of the suspects, as well as subject the police agency to potential legal exposure. The same problem exists in cases in which police dogs are contained in the rear compartments of K-9 units.

In some vehicles, such as police cruisers, a high-powered laptop computer with DC-to-AC inverter is commonly kept in the front vehicle compartment for various purposes, such as for running background checks on suspects, initiating police "paperwork", and the like. These and other electronic elements in the vehicle have a tendency to heat up considerably during use. Accordingly, it would be desirable to have a vehicle ventilation conduit system that is adapted for cooling the rear compartment occupants of a vehicle, as well as components in the vehicle interior which have a tendency to overheat during use.

Air duct systems for vehicles are known in the prior art. However, these known air duct systems generally suffer from one or more drawbacks and limitations which render them unsuitable for applications in which the system components are to be releasably attached to vehicle components and to a protective partition that divides front and rear compartments of a vehicle and in which electronic accessories in the vehicle require cooling. For example, U.S. Pat. No. 4,172,494 discloses an air transfer system for conveying conditioned air from an air spreader 11 (directing air into a main cabin of a vehicle 1), through a main conduit 9, into an attached vehicle 3, such as a camper, trailer or the like. The main conduit 9 is attached at one end to the air spreader 11 within the vehicle 1. The other end of the main conduit 9 extends through an air outlet passage in the back window 5 of the vehicle cabin and is supported adjacent to a hole or air inlet passage in the front window 7 of the camper 3. Each end portion of the main conduit 9 has a collar 13 that is slidably received within a raised portion 15 of adaptors 17 mounted to the air spreader 11 and the front window 7.

U.S. Pat. Nos. 2,882,809 and 5,511,842 disclose duct systems for transferring conditioned air from a temperature-controlling unit in a front area of a vehicle to a rear passenger seating area. However, each of the referenced patents appears to disclose ductwork of a more permanent nature (i.e., not easily removable) extending through a protection barrier 12 ('842 patent) or a floor tunnel 13 ('809 patent).

U.S. Pat. Nos. 3,280,896; 4,478,052; 4,981,324; 5,794,683; and 6,079,781 disclose conditioned air transfer systems for vehicles wherein a first end of a ductwork is adapted for attachment to a source of conditioned air in the front end of the vehicle and an opposite, second end of the ductwork is adapted for attachment to a device within the vehicle including, for example, a hair dryer bag ('896 patent), a food storage receptacle ('052 patent), a ventilated back support pad ('324 patent), a beverage cooler ('683 patent) and a ventilated child restraint seat ('781 patent). Furthermore, U.S. Pat. No. 5,823,869 discloses a self-retracting and extensible air duct in combination with an air distribution system and a nozzle for allowing use of a treated air stream at remote locations within a vehicle's interior.

U.S. Pat. No. 3,211,076 discloses an air cooling unit for truck tractors which includes a first conduit, one end of which is attached to a refrigerant unit in a truck trailer and the other end of which is attached to a blower mounted on the interior wall surface of the truck trailer. A second conduit includes one end attached to the blower. The second conduit extends from the truck trailer and into the truck cab, where cooled air from the refrigerant unit is blown by the blower from the second end of the second conduit, into the truck cab.

None of the individual aforementioned references appears to disclose an assembly incorporating a flexible tubing having a first adaptor at one end configured for releasable sealing engagement with a front vehicle air vent and a second adaptor at an opposite end configured for releasable sealing engagement with a partition separating the front and rear portions of a vehicle, wherein the adaptor is positioned over partition apertures. Furthermore, none of the references appears to disclose a manifold/valve assembly for controlling the vent airflow to the rear vehicle compartment as well as to one or more electronic assemblies requiring cooling.

Accordingly, there is a well-established need for a vehicle ventilation conduit system which is adapted for use in police cruisers and other cars having an interior protective partition dividing front and rear vehicle compartments. In particular, it would be desirable to provide a vehicle ventilation conduit system having a first end which is adapted for releasable sealing engagement with a front vehicle air vent and a second end adapted for releasable sealing engagement with a partition having air apertures. Still further, it would be desirable to provide a vehicle ventilation conduit system which may be readily used in a variety of vehicles for the efficient and effective heating and/or cooling of an enclosed compartment within a vehicle. Furthermore, it would be desirable to provide such a vehicle ventilation conduit system which facilitates airflow to one or more electronic accessories in the vehicle to cool the accessories.

SUMMARY OF THE INVENTION

The invention is directed to vehicle ventilation conduit system for heating or cooling a rear or other interior compartment which is separated from the main interior of a vehicle, and is particularly adapted for but not limited to use in police cruisers having a protective partition dividing a front compartment from a rear compartment in the vehicle. The apparatus incorporates a compact, efficient design which may be provided in releasable sealing engagement with both a front vehicle air vent and a dividing partition having air flow openings to facilitate the rapid and efficient heating or cooling of a vehicle compartment and may further include the facility for cooling electronic accessories in the vehicle interior.

In one general aspect of the present invention, a vehicle ventilation conduit system for a vehicle having an interior partition is provided comprising:

a main air flow conduit having a first adaptor at one end for releasable sealing engagement with a front vehicle air vent; and a second adaptor provided at an opposite end of the main air flow conduit for releasable sealing engagement with the partition and pneumatic communication with partition openings provided in the partition.

In a further aspect of the present invention, at least one auxiliary air flow conduit has one end which is provided in pneumatic communication with the main air flow conduit. The opposite, discharge end of the auxiliary air flow conduit is adapted for cooling an electronic accessory in the vehicle.

In still a further aspect of the present invention, a conduit manifold is provided in the main air flow conduit. At least one auxiliary air flow conduit is provided in pneumatic communication with the conduit manifold for the simultaneous cooling of multiple electronic accessories in the vehicle.

In a still further aspect of the present invention, an attachment bracket is provided on the discharge end of at least one auxiliary air flow conduit to facilitate attachment of the auxiliary air flow conduit to an electronic accessory support platform and to direct cooling discharge air from the conduit toward a housing grill or other element of an electronic accessory, such as a laptop computer, supported on the platform.

In another aspect of the present invention, a manifold mount bracket is provided to facilitate mounting of the conduit manifold element of the vehicle ventilation conduit system directly to a mount surface such as a floorboard in the vehicle.

In yet a further aspect of the present invention, the discharge end of at least one auxiliary air flow conduit is provided with an attachment adaptor to facilitate the clamping attachment of the auxiliary air flow conduit to a mobile DC-to-AC power inverter.

Still another aspect of the present invention provides a vehicle ventilation conduit system which is efficient and capable of use in a variety of vehicles.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENTS

Shown throughout the figures, the present invention is generally directed to a vehicle ventilation conduit system for distributing cool or warm air, as appropriate, from a front air vent in a front vehicle compartment to a rear vehicle compartment that is separated from the front compartment by a partition in a vehicle. The apparatus incorporates a simple and efficient design which may be further used to facilitate the distribution of cooled air to electronic accessories in the vehicle which otherwise have a tendency to overheat.

Figure 1:
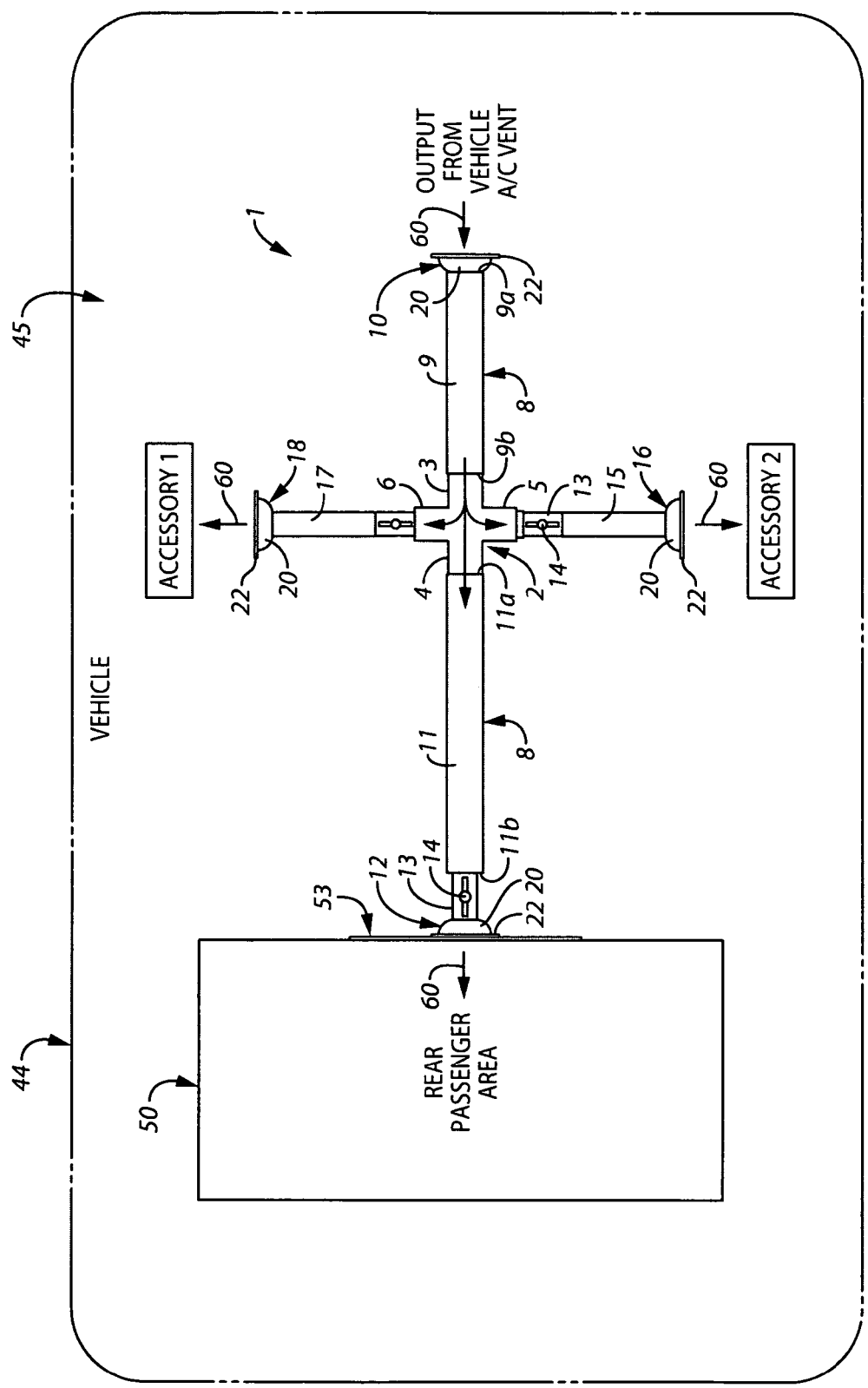
FIG. 1 is a schematic representation of the vehicle ventilation conduit system of the present invention.
Figure 2:
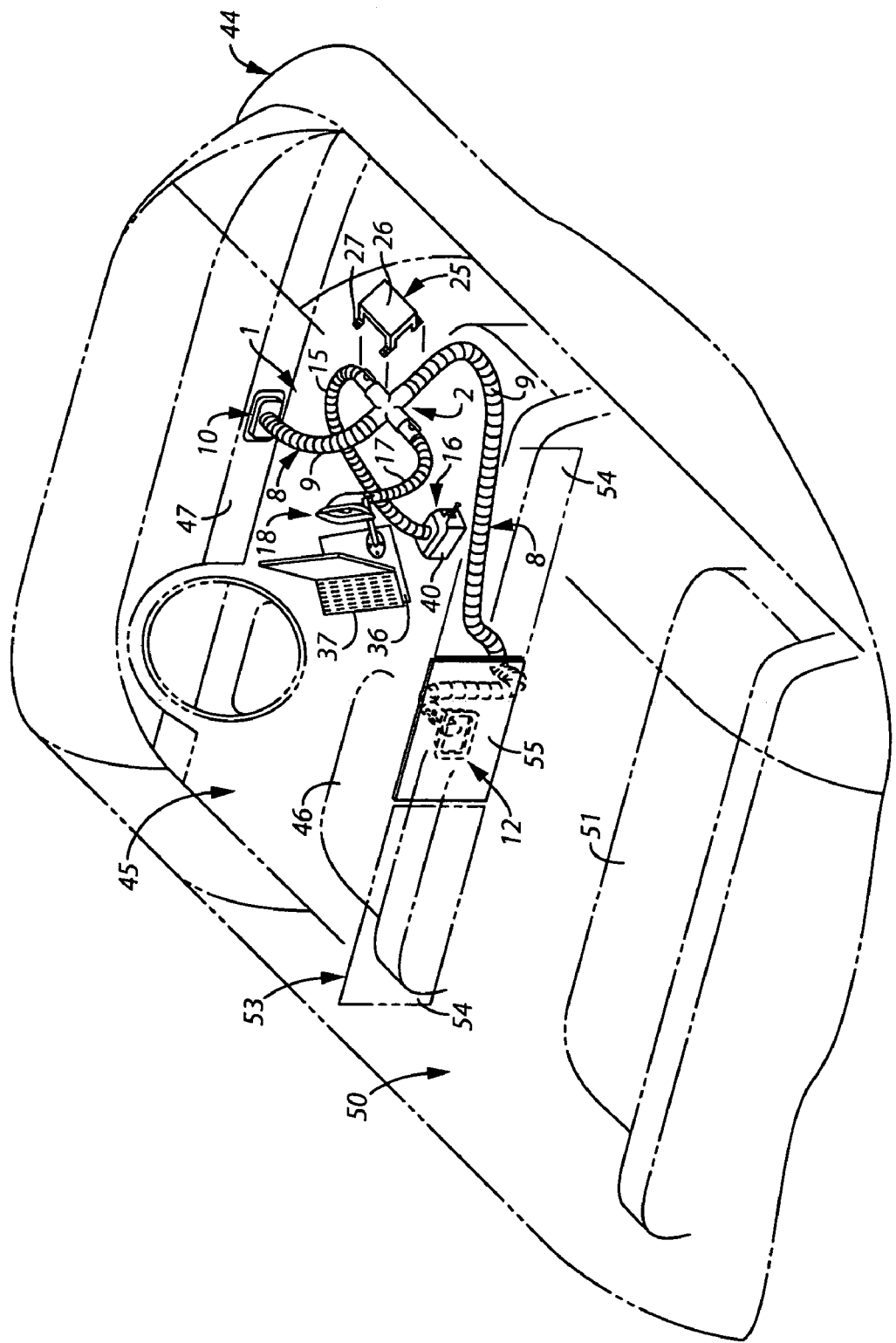
FIG. 2 is a perspective view of the system, shown within a vehicle interior.

Referring initially to FIGS. 1 and 2, a preferred embodiment of the vehicle ventilation conduit system, hereinafter referred to as the system, of the present invention is generally indicated by reference numeral 1. As hereinafter further described, the system 1 is designed to be removably installed in a vehicle 44, such as a police cruiser, for example, having a protective partition 53 separating a front compartment 45 from a rear compartment 50. As illustrated in FIG. 1, the system 1 distributes cool or warm air 60, as appropriate, from a vehicle A/C vent (not illustrated), contained in the front compartment 45, to the rear compartment 50. In the event that the air 60 from the vehicle A/C vent is cool air, the system 1 may further distribute the cool air 60 to one or multiple accessories (labeled "accessory 1" and "accessory 2" in FIG. 1), such as a mobile DC-to-AC power inverter 40 and/or a laptop computer 37, for example, as illustrated in FIG. 2.

As illustrated in FIG. 2, the front compartment 45 of the vehicle 44 contains a front seat 46 on which a vehicle driver (not illustrated) sits during operation of the vehicle 44. The front A/C vent (not illustrated) is typically provided in the dashboard 47 or in an alternative location of the front compartment 45. The rear compartment 50 contains a rear seat 51 on which a passenger or passengers (not illustrated) sit during operation of the vehicle. Typically, the passenger or passengers sitting on the rear seat 51 in the rear compartment 50 are suspects being transported to a police station.

The protective partition 53 extends between the floor and ceiling of the vehicle 44, between the front seat 46 and rear seat 51, and extends across the transverse dimension of the vehicle 44. The protective partition 53 illustrated in FIG. 2 includes a pair of side panels 54 provided on respective sides of a center panel 55. However, rather than having the side panels 54 and the center panel 55, the protective partition 53 may alternatively be a continuous transparent panel. The side panels 54 and center panel 55 may be constructed from Plexiglass, for example. Alternatively, as is the case in many modern police cruisers, the center panel 55 may be constructed from steel or another metal.

Referring next to FIGS. 1–6, the system 1 includes a conduit manifold 2, typically having a front attachment arm 3; a rear attachment arm 4; and a pair of auxiliary attachment arms 5 and 6, respectively, between the front attachment arm 3 and rear attachment arm 4. While the conduit manifold 2 shown in the drawings has a pair of auxiliary attachment arms 5, 6, respectively, it is understood that the conduit manifold 2 may alternatively have one, three or more auxiliary attachment arms depending on the number of areas and/or accessories in the vehicle 44 which require separate air delivery.

A main air flow conduit 8 includes an elongated, flexible front conduit segment 9, having an inlet end 9a and a discharge end 9b; and an elongated, flexible rear conduit segment 11, having an inlet end 11a and a discharge end 11b. The discharge end 9b of the front conduit segment 9 is attached to the front attachment arm 3 of the conduit manifold 2. Similarly, the inlet end 11a of the rear conduit segment 11 is attached to the rear attachment arm 4 of the conduit manifold 2. A front sealing adaptor 10 is provided on the inlet end 9a of the front conduit segment 9, and a rear sealing adaptor 12 is provided on the discharge end 11b of the rear conduit segment 11. An air flow valve 13, having a valve handle 14, may be provided in the rear conduit segment 11. Accordingly, the valve handle 14 may be manipulated to adjust the quantity of air and the flow rate of air flowing through the main air flow conduit 8.

Figure 3:
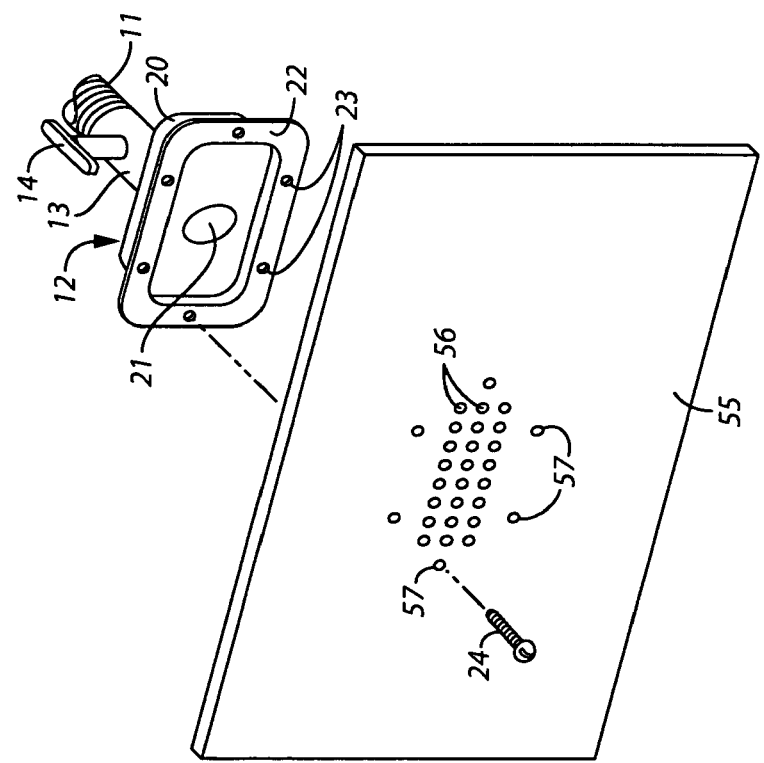
FIG. 3 is an exploded perspective view illustrating sealed attachment of a main or primary air flow conduit outlet to a partition separating front and rear vehicle compartments.

The front sealing adaptor 10 and the rear sealing adaptor 12 are typically similar in construction. As illustrated in FIG. 3, the rear sealing adaptor 12 typically includes a generally concave adaptor body 20 having an air discharge opening 21 which communicates with the discharge end 11b of the rear conduit segment 11. A resilient rubber or plastic gasket 22 is provided on the adaptor body 20 for sealingly engaging the center panel 55 of the protective partition 53 of the vehicle 44, as hereinafter further described. Fastener openings 23 typically extend through the gasket 22. Threaded fasteners 24 are initially extended through respective fastener openings 57 provided in the center panel 55 and threaded into the fastener openings 23, to secure the gasket 22 in sealing engagement with the center panel 55, with the air discharge opening 21 provided in pneumatic communication with air openings 56 extending through the center panel 55. The front sealing adaptor 10 likewise typically includes an adaptor body 20 having an air discharge opening 21, a resilient gasket 22 for sealingly engaging the dashboard 47 or other surface in which the vehicle A/C vent is provided, and fastener openings 23 to facilitate attachment of the front sealing adaptor 10 to the dashboard 47 or other surface.

Auxiliary flow conduits 15, 17 are attached to the auxiliary attachment arms 5, 6, respectively, of the conduit manifold 2. Each auxiliary flow conduit 15, 17 may be attached to the corresponding auxiliary attachment arm 5, 6, through an air flow valve 13, having a valve handle 14, to facilitate adjusting the flow rate and volume of air flowing through each auxiliary flow conduit 15, 17, as needed. Auxiliary sealing adaptors 16 and 18 are provided on the discharge ends of the auxiliary air flow conduits 15, 17, respectively. Each of the auxiliary sealing adaptors 16, 18 typically has the same construction as that of the front sealing adaptor 10 and the rear sealing adaptor 12, heretofore described. The auxiliary sealing adaptors 16, 18 are designed for separate attachment to electronic accessories which tend to overheat in the vehicle 44 in order to cool the accessories during operation, as hereinafter further described.

Figure 4:
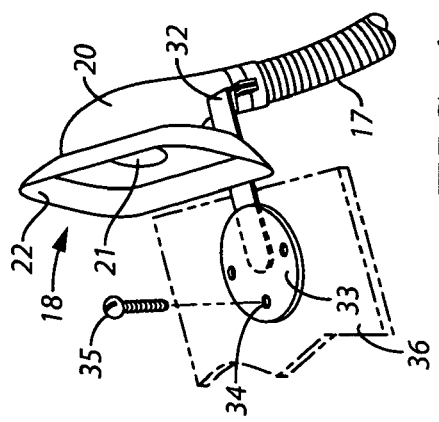
FIG. 4 is a perspective view illustrating attachment of an auxiliary conduit outlet to a laptop computer support platform, such that cooled air exiting the outlet is directed toward a rear computer housing grill (not shown) adjacent to a heat sink and/or other electronic components requiring cooling.

As illustrated in FIG. 2, a laptop computer 37 may be mounted on a laptop computer support platform 36 provided in the front compartment 45 of the vehicle 44. As illustrated in FIG. 4, an elongated conduit mount bracket 32 may be provided on the auxiliary sealing adaptor 18 of the auxiliary air flow conduit 17 for attachment of the auxiliary sealing adaptor 18 to the laptop computer support platform 36. A bracket mount plate 33, having multiple fastener openings 34, may be used to mount the conduit mount bracket 32 to the laptop computer support platform 36. Accordingly, multiple threaded fasteners 35 may be extended through the respective fastener openings 34 in the bracket mount plate 33 and threaded into respective openings (not shown) provided in the laptop computer support platform 36. The conduit mount bracket 32 and bracket mount plate 33 may be used to mount the auxiliary sealing adaptor 18 in such a manner that the air discharge opening 21 of the auxiliary sealing adaptor 18 is oriented toward a rear computer housing grill (not illustrated), for example, provided on the laptop computer 37.

Figure 6:
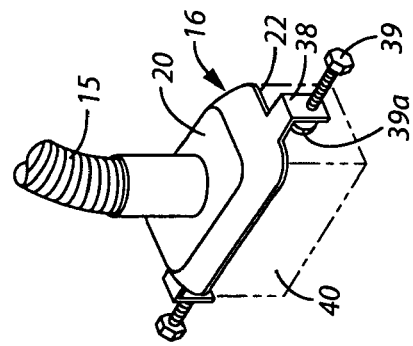
FIG. 6 is a top perspective view illustrating clamping attachment of an auxiliary air flow conduit directly to a mobile DC-to-AC inverter.

As illustrated in FIGS. 2 and 6, the auxiliary sealing adaptor 16 of the auxiliary air flow conduit 15 may be adapted for attachment to a mobile DC-to-AC power inverter 40 used to power the laptop computer 37, for example. Accordingly, a pair of attachment flanges 38 may be provided on the adaptor body 20 of the auxiliary sealing adaptor 16. Threaded fasteners 39 may be threaded through fastener openings (not shown) provided in the respective attachment flanges 38. An engagement disk 39a may be provided on the end of each threaded fastener 39 to engage the power inverter 40 and secure the auxiliary sealing adaptor 16 on the power inverter 40. As will be apparent to those skilled in the art, means should be provided for ensuring that the air flow exiting adaptor 16 is at least partially vented. Preferably, the attachment flanges 38 are secured such that there is a space, or gap (not shown), between sealing member 22 of main body 20 and power inverter 40. While the required venting is achieved by providing such a gap, it is understood that any alternative means of enabling such venting may be employed. By way of example, openings could be provided extending completely through adaptor body 20.

Figure 5:
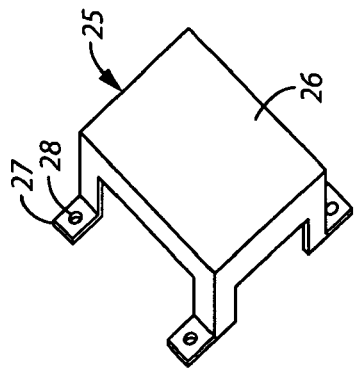
FIG. 5 is a top perspective view of a molded plastic member used to secure a conduit system manifold directly to a vehicle main cabin surface.

As illustrated in FIGS. 2 and 5, the system 1 may include a manifold mount bracket 25 for mounting the conduit manifold 2 to a floorboard (not shown) or other surface inside the vehicle 44. As illustrated in FIG. 5, the manifold bracket 25 may include a bracket body 26, which is typically constructed of molded plastic. Multiple bracket flanges 27, each of which may have a fastener opening 28, extend from the bracket body 26 to facilitate typically bolted attachment of the manifold mount bracket 25 to the floorboard or other surface. Accordingly, as illustrated in FIG. 2, the manifold mount bracket 25 can be fitted over the conduit manifold 2, with the bracket flanges 27 extending on respective sides of the front attachment arm 3, rear attachment arm 4 and auxiliary attachment arms 5, 6. Bolts (not illustrated) are then extended through the respective fastener openings 28 and threaded into respective openings (not shown) provided in the floorboard or other surface.

In typical use, the system 1 distributes cooled air 60 (FIG. 1) from a front A/C vent (not shown) in the front compartment 45 of the vehicle 44, to the rear compartment 50 of the vehicle 44, in warm or hot weather. The system 1 may simultaneously distribute cooled air 60 to electrical accessories such as a laptop computer 37 (FIG. 2) and a mobile DC-to-AC power inverter 40 in the front compartment 45. Accordingly, the front sealing adaptor 10 of the main air flow conduit 8 is removably attached to the dashboard 47, in pneumatic communication with an A/C vent (not shown) provided in the dashboard 47. This attachment may be facilitated using multiple threaded fasteners 24, as heretofore described with respect to the rear sealing adaptor 12 in FIG. 3, or using any suitable alternative method. In like manner, the rear sealing adaptor 12 is removably attached to the center panel 55 of the protective partition 53, with the air discharge opening 21 (FIG. 3) provided in pneumatic communication with the air openings 56 extending through the center panel 55. The manifold mount bracket 25 may be used to secure the conduit manifold 25 to the floorboard (not illustrated) or other surface in the vehicle 44, as illustrated and heretofore described with respect to FIG. 2.

As illustrated in FIG. 4, the auxiliary sealing adaptor 18 of the auxiliary air flow conduit 17 may be attached to the laptop computer support platform 36 typically by securing the conduit mount bracket 32 between the bracket mount plate 33 and platform 36 using the threaded fasteners 35. As illustrated in FIG. 6, the auxiliary sealing adaptor 16 may be attached to the mobile DC-to-AC power inverter 40 typically by threading the fasteners 39 through the respective attachment flanges 38 and causing engagement of the engagement disks 39a against the power inverter 40. It is understood that the auxiliary sealing adaptor 18 may be secured to the platform 36, and the auxiliary sealing adaptor 16 to the power inverter 40 using any suitable alternative attachment mechanism known by those skilled in the art. Furthermore, rather than being attached to the platform 36 and the power inverter 40, it is understood that the auxiliary sealing adaptors 16, 18 may be attached to alternative electronic accessories in the vehicle 44 for cooling of those components, as deemed necessary.

As illustrated in FIG. 1, by operation of the air conditioning system (not illustrated) of the vehicle 44, the cooled air 60 is then distributed from the AC vent (not shown), through the main air flow conduit 60 and into the rear compartment 50 through the air openings 56 (FIG. 3) in the protective partition 53, to cool the rear compartment 50. Simultaneously, some of the cooled air 60 is distributed through the auxiliary air flow conduit 15 and auxiliary sealing adaptor 16 to cool the mobile DC-to-AC power inverter 40. Some of the cool air 60 is likewise distributed through the auxiliary air flow conduit 17 and auxiliary sealing adaptor 18, to cool the laptop computer 37.

It will be appreciated by those skilled in the art that some or all of the air flowing through the main air flow conduit 8 may be diverted to the mobile DC-to-AC power inverter 40 and/or to the laptop computer 37 through the respective auxiliary air flow conduits 15, 17, by manipulation of the valve handle 14 provided on the air flow valve 13 of the rear conduit segment 11. Likewise, the quantity of air flowing through the auxiliary air flow conduits 15, 17 may be adjusted by manipulating the valve handles 14 of the respective air flow valves 13. Furthermore, flow of air to the rear compartment 50 of the vehicle 44 may be maximized, as necessary, by opening the air flow valve 13 of the rear conduit segment 11 to the fully-opened position and closing the auxiliary air flow conduits 15, 17 using the valve handles 14 of the respective air flow valves 13.

In cool or cold weather, the system 1 can be used in the same manner as that described herein above to distribute heated air to the rear compartment 50. However, the auxiliary air flow conduits 15, 17 remain unattached to electrical accessories such as the laptop computer 37 and mobile DC-to-AC inverter 40 which may require an extraneous cooling source.

Since many modifications, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A vehicle ventilation conduit system for distributing air from an air vent to a rear vehicle compartment, comprising:
    an elongated main air flow conduit having an inlet end and a discharge end;
    a front sealing adaptor carried by said main air flow conduit at said inlet end for releasably and sealingly engaging the air vent; and
    a rear sealing adaptor carried by said main air flow conduit at said discharge end for releasably and sealingly engaging the rear vehicle compartment.

2. The system of claim 1 further comprising at least one auxiliary air flow conduit provided in pneumatic communication with said main air flow conduit.

3. The system of claim 1 wherein said front sealing adaptor and said rear sealing adaptor each comprises an adaptor body carried by said main air flow conduit and a sealing gasket carried by said adaptor body.

4. The system of claim 3 further comprising at least one auxiliary air flow conduit provided in pneumatic communication with said main air flow conduit.

5. The system of claim 2 further comprising a conduit mount bracket carried by said at least one auxiliary air flow conduit.

6. The system of claim 5 wherein said front sealing adaptor and said rear sealing adaptor each comprises an adaptor body carried by said main air flow conduit and a sealing gasket carried by said adaptor body.

7. The system of claim 1 further comprising an air flow valve provided in said main air flow conduit for adjusting flow of the air through said main air flow conduit.

8. The system of claim 7 further comprising at least one auxiliary air flow conduit provided in pneumatic communication with said main air flow conduit.

9. The system of claim 7 wherein said front sealing adaptor and said rear sealing adaptor each comprises an adaptor body carried by said main air flow conduit and a sealing gasket carried by said adaptor body.

10. The system of claim 9 further comprising at least one auxiliary air flow conduit provided in pneumatic communication with said main air flow conduit.

11. The system of claim 7 further comprising a conduit mount bracket carried by said at least one auxiliary air flow conduit.

12. The system of claim 11 wherein said front sealing adaptor and said rear sealing adaptor each comprises an adaptor body carried by said main air flow conduit and a sealing gasket carried by said adaptor body.

13. A vehicle ventilation conduit system for distributing air from an air vent to a rear vehicle compartment, comprising:
- a conduit manifold;
- a front conduit segment provided in fluid communication with said conduit manifold;
- a front sealing adaptor carried by said front conduit segment for releasably and sealingly engaging the air vent;
- a rear conduit segment provided in fluid communication with said conduit manifold;
- a rear sealing adaptor carried by said rear conduit segment for releasably and sealingly engaging the rear vehicle compartment; and
- at least one auxiliary air flow conduit provided in fluid communication with said conduit manifold.

14. The system of claim 13 wherein said front sealing adaptor and said rear sealing adaptor each comprises an adaptor body carried by said main air flow conduit and a sealing gasket carried by said adaptor body.

15. The system of claim 13 further comprising a conduit mount bracket carried by said at least one auxiliary air flow conduit.

16. The system of claim 15 wherein said front sealing adaptor and said rear sealing adaptor each comprises an adaptor body carried by said main air flow conduit and a sealing gasket carried by said adaptor body.

17. A vehicle ventilation conduit system for distributing air from an air vent to a rear vehicle compartment, comprising:
- a conduit manifold having a plurality of attachment arms;
- a front conduit segment provided in fluid communication with said conduit manifold at a first one of said attachment arms;
- a front sealing adaptor carried by said front conduit segment for releasably and sealingly engaging the air vent;
- a rear conduit segment provided in fluid communication with said conduit manifold at a second one of said attachment arms;
- a rear sealing adaptor carried by said rear conduit segment for releasably and sealingly engaging the rear vehicle compartment; and
- a plurality of auxiliary air flow conduits provided in fluid communication with said conduit manifold at respective ones of said attachment arms.

18. The system of claim 17 wherein said front sealing adaptor and said rear sealing adaptor each comprises an adaptor body carried by said main air flow conduit and a sealing gasket carried by said adaptor body.

19. The system of claim 17 further comprising a conduit mount bracket carried by said at least one auxiliary air flow conduit.

20. The system of claim 19 wherein said front sealing adaptor and said rear sealing adaptor each comprises an adaptor body carried by said main air flow conduit and a sealing gasket carried by said adaptor body.

* * * * *